Figure 1:
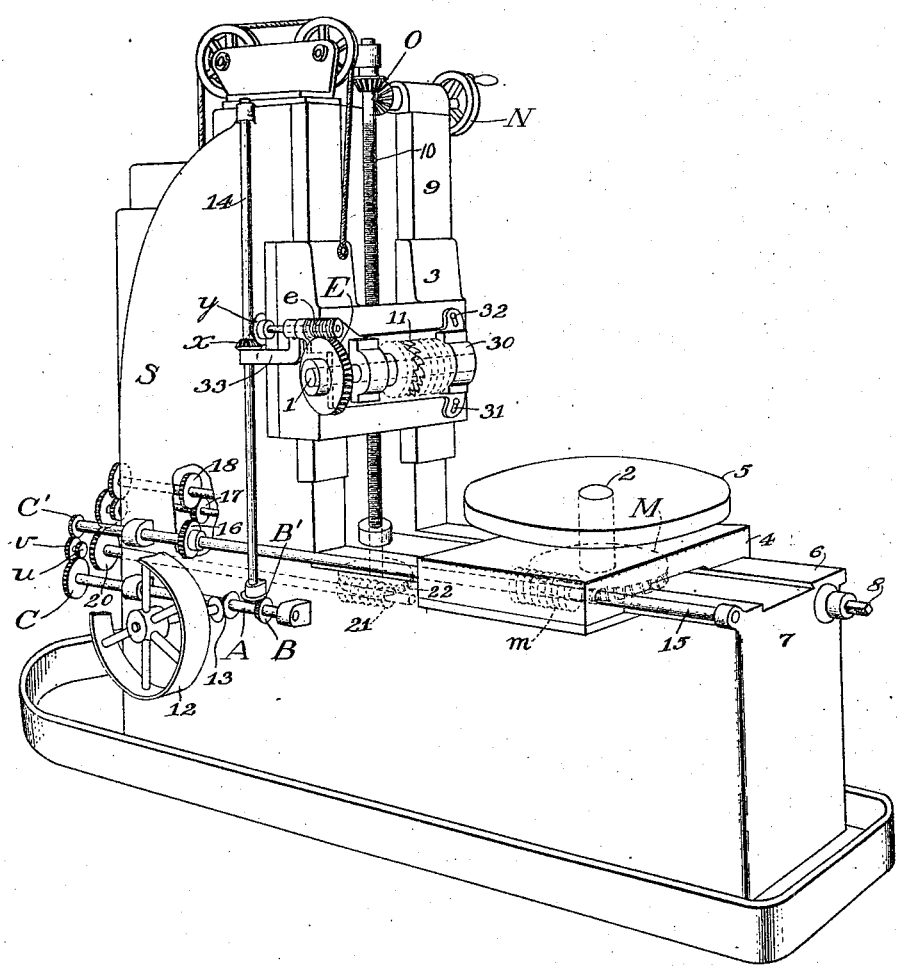

Oct. 12, 1926.

W. F. ZIMMERMANN 1,603,258

BALANCED DRIVE SWIVELED CUTTER HOBBING MACHINE

Filed June 16, 1924    2 Sheets-Sheet 1

Inventor

William F. Zimmermann

By Attorney

Albert F. Nathan

Oct. 12, 1926.
W. F. ZIMMERMANN
1,603,258
BALANCED DRIVE SWIVELED CUTTER HOBBING MACHINE
Filed June 16, 1924    2 Sheets-Sheet 2
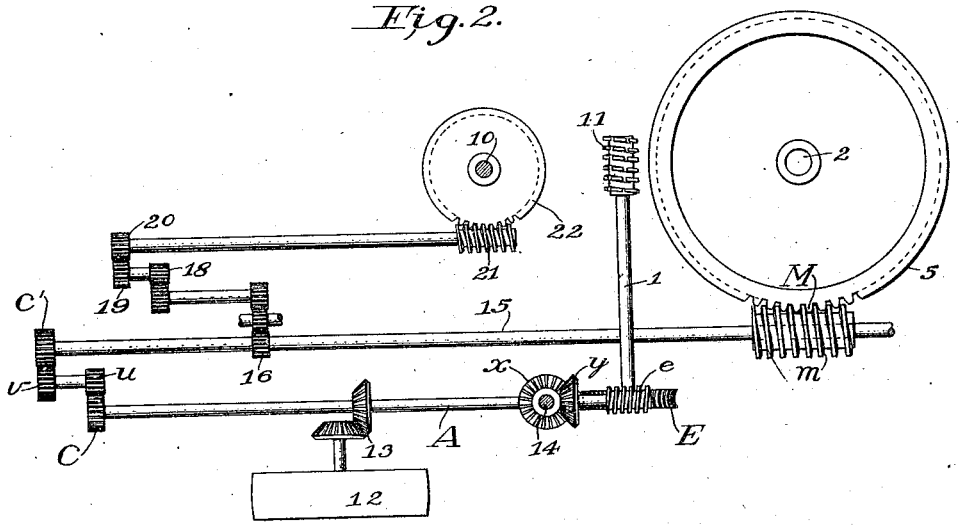
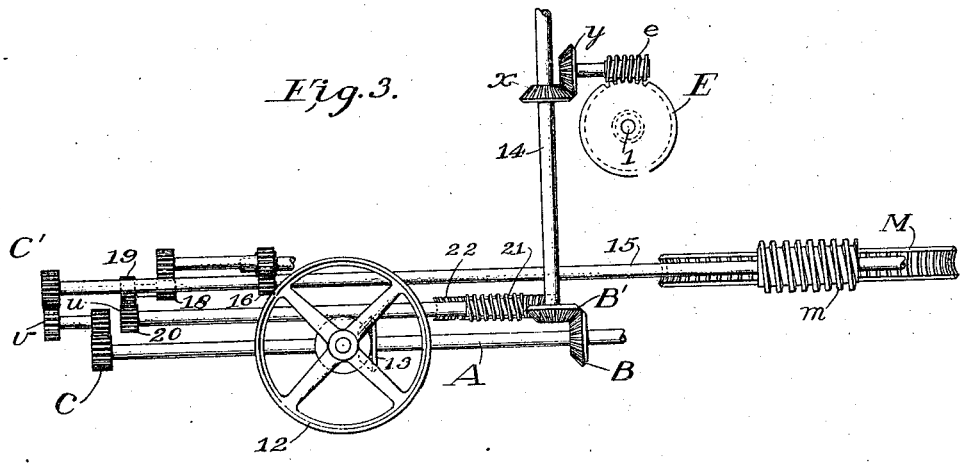
Inventor
William F. Zimmermann
By Attorney
Albert F. Nathan Patented Oct. 12, 1926.

1,603,258

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

BALANCED-DRIVE SWIVELED-CUTTER HOBBING MACHINE.

Application filed June 16, 1924. Serial No. 720,393.

This invention deals with machines for generating gears by the cutting action of a so-called "hob" and the primary object is to render available a structural arrangement so organized as to contribute towards the attainment of a high degree of accuracy in the machine, while yet providing sufficient adaptability to produce either spur gears of different pitches and a fairly wide range in the number of teeth, or helical gears of a given angle and different pitches and a fairly wide range in the numbers of teeth; all without sacrificing the advantages of a balanced drive between the prime mover and the respective spindles.

In my Patent #1,472,767, there is shown a machine based on a simplified and symmetrical arrangement which practical usage has demonstrated to be highly accurate, sturdy and suitable for intensive production of gears within its range; such machine perhaps being most suitable for producing spur-gears of a single-pitch and a limited range in numbers of teeth.

The objective of this invention is so to improve that organization that the machine will be materially extended in range, as above stated, while yet adhering in a pronounced measure to the advantageous principles of construction and arrangement pointed out in my aforesaid patent; all as will appear more clearly hereinafter.

Fig. 1 is a perspective of a machine embodying my improvements; Fig. 2 is a diagram in plan of its transmission system; and Fig. 3 is a diagram in elevation of the same.

The invention contemplates two spindles arranged transversely; one being utilized as a hob-supporting spindle, represented by 1 and the other being utilized as a work-supporting spindle represented by 2. These spindles are appropriately mounted; as for example, in the heads indicated by 3 and 4 respectively. The hob-supporting spindle is, however, so secured to the head 3 that it may be swiveled to a limited extent and thereby set at a slight angle on the head. But this limited tiltability is accomplished in a manner intimately related to and contributing to the attainment of a balanced drive of the spindles through the agency of the minimum number of angle gears. This will be explained later but here it may be noted that on the head 3 is a spindle bearing 30 which, instead of being centrally pivoted to the head, has an off-set pivot coaxial with the intermediate angle-gears $y$ $e$ that convey the motion from the angle gear $x$ on the shaft 14 to that on the spindle 1. Arcuate slots 31 and appropriate bolts 32 accomplish this function; the radii of said slots being centered upon the axis of the intermediate angle-gears $y$ $e$.

Ordinarily, the work-supporting spindle will present a table 5 for convenience in the mounting of the blank or blanks to be cut and the parts will be so arranged as to permit of a so-called "feed", i. e., relative translation between the respective spindles while they are rotating. It is immaterial whether this relative feed be obtained by the absolute translation of the cutter-supporting spindle or by the absolute translation of the work-supporting spindle and it is likewise immaterial which of these spindles be arranged vertically; the important consideration being that they are transverse to one another and that provision is made for an offset mounting on the axis of the cutter-supporting spindle with respect to the axis of the work-supporting spindle so that the teeth of the hob will operate on the periphery of the blank. When it is desirable to use the machine for cutting different diameters of gears, it is essential to provide for an adjustment of the aforesaid offset relation and that may conveniently be attained in the manner illustrated by the embodiment of the invention depicted by Fig. 1 in which the carriage 4 is adjustable along the slide 6 provided by the body-portion 7 of the machine; a screw-shaft such as 8, of conventional construction, being available for facilitating the adjustment. The relative translation or feed is likewise obtained by providing for a corresponding travel either of the blank spindle in the direction of its axis or, as shown by way of example by Fig. 1, of the cutter-spindle transversely to its axis. In the latter case, the stanchion S of the machine provides a slideway 9 extending parallel with the axis of the work-supporting spindle, and the head 3 (on which the cutter-spindle 1 is swivelly journaled) is caused to travel along the slideway 9; this action being performed in a conventional manner by means of an ordinary feed-screw 10 deriving motion in any appropriate manner. By these means, the hob 11 is caused bodily to be shifted in a direction parallel with the axis of the work-supporting spindle during the process of generating the teeth on the blank.

This invention contemplates not more than three long transmission shafts in the transmission determining the relation between the rotations of the cutting-spindle and the rotations of the work-supporting spindle, and it proposes to mount and arrange such gears and shafts as are actually employed in a manner affording a very high degree of precision in the construction and performance of the machine. Very important, likewise, is the characteristic of this invention which resides in the employment of a single power-driven intermediate-shaft arranged in equalized relation to the two spindles, respectively, so that the propelling force will flow from approximately a midpoint in opposite directions to the respective spindles through six angle gears only to the hob-spindle, and through a balanced number of gears only (i. e. six) to the work-spindle. Of these two sets of six gears, one pair of the one set extends the range of the machine by making provision for swiveling the hob-spindle to a limited extent, and one pair of the other set makes provision for extending the range of relative rotations between the spindles; these two pairs being balanced against each other and thus jointly increasing the range of the machine and adapting it to produce either spur gears of different pitches and a fairly wide range in the number of teeth, or helical gears of a given angle and different pitches and a fairly wide range in the numbers of teeth. This characteristic of construction will best be understood by referring to the drawings in which A indicates the intermediate long power-driven shaft in balanced-drive relation between the respective spindles. This shaft derives its motion, in the first instance, from a suitable prime-mover 12, as by means of suitable gearing 13, the specific character of which is unimportant. The power is taken from the shaft A at two separated points and flows in opposite directions to the respective spindles. A noteworthy characteristic of the arrangement is that the intermediate shaft A carries two distinctive species of gears, to wit, a bevel-gear B and likewise a spur-gear C; these gears being preferably rigidly secured to the shaft A and spaced apart thereon so that the three elements will all rotate as a single unit and so that the gears mentioned will be relieved from the necessity of having individual stud journals and will be maintained absolutely in co-axial relation and likewise in accurate relation to the gears meshing therewith by reason of the facility with which the relatively long shaft A may be accurately journaled. In the form shown by Fig. 1 the bevel-gear B (which is to be regarded as representing an optional species of right-angled gear-drive) delivers the motion for rotating one of the spindles, while the spur-gear C delivers the motion for rotating the other spindle.

For establishing a propelling relation between the intermediate drive-unit C—A—B and the respective spindles, this invention embraces a first transmitting means comprising a change spur-gear C' meshing through two change gears $v$ $u$ with the change gear C, and a second transmitting means comprising a bevel-gear B' meshing with the gear B. In the embodiment of the invention depicted by Fig. 1, the gears C' and B' are secured to the ends of shafts 15 and 14 which are positioned by widely spaced journals carried by the frame of the machine; one of said shafts extending parallel to the direction of "feed" between the blank and the cutter, and the other one of said shafts extending parallel to the direction of adjustment in the offset of the cutter to the axis of the work. This enables the respective spindles to be driven by angle-gears $x$ and $m$ splined directly to said shafts. For example, the work-supporting spindle is driven by a worm-wheel M which takes its motion from a worm $m$ that is splined to the shaft 15 and thus permits the offset relation of the spindles to be adjusted for different diameters of teeth, by shifting the carriage 4 towards or away from the line of feed of the hob. With respect to the hob-spindle, the head 3 has a suitable bracket 33 which journals the angle-gear $x$ and causes it to slide on the shaft 14 (to which it is splined) and be kept in true mesh with the angle gear $y$ of the unit $y$ $e$ wich is likewise journaled on the head 3 transversely to the shaft 14; the axis of the unit $y$ $e$ being utilized as an off-set center of swivel for the hob bearing 30. It may be noted here that, since that center of swivel is off-set, the hob may not be swiveled through such a wide range of angles as if the center of swivel had been conincident with the center of the hob and thus the range of the machine is to that extent restricted; but the advantages is that the construction is greatly simplified and requires precisely the two gears extra required to balance the drive in combination with the same number of two extra gears $u$ and $v$ employed as extra change gears for materially extending the range of speeds of the work relative to the cutter. In other words, the employment of the two extra gears $u$ and $v$ is made possible without disturbing the balance of the drive of the spindles, by using also the two extra gears $x$ and $y$, and conversely and thus not only is the speed range extended through the four change-gears C, $u$, $v$ and C' but the hob may be disposed at various angles within a considerable range.

Thus it will be seen that, while the entire mechanism is balanced as to drive and exhibits an extreme simplicity, nevertheless the range and adaptability of the machine has been materially extended. Starting with the initially-driven element of the transmission, each spindle drive is accomplished excluding mere pivots or stub-shafts by six gears and one elongated shaft only thereby contributing greatly to accuracy in mechanical assembly and steadiness and smoothness in operation through the balanced drive. Of the total number of twelve gears employed, it is to be noted that only two are splined to slide on their shafts; the one being in the one transmission and the other in the other transmission.

So far as the feeding is concerned, no great difficulty has been experienced in securing a high steady advance inasmuch as the motion is a relatively slow one derived from a nut mounted in the sliding head and a conventional feed screw 10. As a matter of convenience, the feed screw may be rotated by a branch-line transmission located wherever desired, as for example, it may comprise the train of gears 16, 17, 18, 19, 20, 21 and 22 as will be understood. For preliminary adjustments, the hand-wheel N directly operating the bevel-gears O may be used for turning the screw 10.

Having thus revealed this invention, I claim as new and desire to secure the following combinations and elements, or equivalents thereof, by Letters Patent of the United States:

1. A balanced-drive hobbing-machine combining a swivelable hob-supporting spindle and a work-supporting spindle; a transmission connecting said spindles and consisting of not more than three long shafts, two of said shafts being arranged parallel to each other and transversely to one of said spindles, the adjacent ends of said two parallel shafts being directly connected by four change gears of the spur-tooth type, the third shaft of said transmission being arranged transversely to the hob-supporting spindle and being geared thereto by four angle gears; said third shaft being geared at its other end directly to the intermediate one of said two parallel shafts; a prime-mover geared directly to the intermediate shaft whereby the power for driving said spindles will be derived from the respective ends thereof; and means for effecting a progressive relative translation between said spindles in a direction parallel with the work-supporting spindle.

2. A balanced-drive hobbing-machine combining a swivelable hob-supporting spindle and a work-supporting spindle arranged transversely thereto, a first long shaft arranged transversely to said hob-supporting spindle; a last long shaft arranged transversely to said work-supporting spindle, the end of said first shaft being closely adjacent and geared to the hob-supporting spindle by four angle gears, and the last shaft being geared to the work-supporting spindle by two angle gears; an intermediate shaft arranged parallel with one of said transmission shafts; four intermeshing spur-gears, one secured directly to said intermediate shaft, another directly to the transmission shaft parallel therewith; and means for effecting a progressive relative translation between said spindles in a direction parallel with the work-supporting spindle.

3. A balanced-drive hobbing-machine combining a swivel-mounted hob-supporting spindle and a laterally-shiftable work-supporting spindle, three shafts in series, the first and the third being transverse to said spindles respectively, and the intermediate second shaft being transverse to one of said shafts and parallel with the other shaft; six gears, four of the spur-tooth type completing the transmission from the intermediate second shaft to the work-supporting spindle; six gears all of the angle-gear type completing the transmission between the intermediate shaft and the hob-supporting spindle; and means for effecting a progressive relative translation between said spindles in a direction parallel with the work-supporting spindle.

4. A balanced-drive hobbing-machine combining a bed having a fixed stanchion; a head slidable on said fixed stanchion; a hob-supporting spindle swivelly mounted on said head; a carriage slidable on said bed; a work-supporting spindle on said carriage; a prime mover; an intermediate shaft geared between its ends directly to said prime-mover; an angle-gear mounted at one end of said intermediate shaft, and a spur-gear mounted at its other end; a hob driving transmission comprising a shaft and five angle-gears, one of said angle gears meshing directly with the angle-gear on said intermediate shaft; a work-driving transmission comprising a shaft and three spur gears and two angle gears, one of said spur gears directly meshing with the spur-gear on said intermediate shaft; and means for effecting a progressive feed of said head in a direction parallel with the work-supporting spindle.

5. A balanced drive hobbing-machine combining a bed having a fixed stanchion; a head slidable thereon; a hob-supporting spindle swivelly mounted on said head; a carriage on said bed; a work-supporting spindle on said carriage; a three-shaft transmission connecting said spindles, two of said shafts being arranged parallel to each other and one of said parallel shafts being splined transversely to said work-supporting spindle, the adjacent ends of said two parallel shafts being connected by four change-gears of the spur-tooth type, the third shaft of said transmission being splined, and arranged transversely to the other spindle and being connected by four angle gears to said other spindle and, at its other end, being connected by angle-gears directly to the intermediate one of said two parallel shafts; a prime-mover geared directly to the intermediate shaft whereby power will be derived from its respective ends for driving said spindle-propelling shafts; and means for effecting a progressive feed of said head in a direction parallel with the work-supporting spindle.

6. A hobbing-machine combining shiftable head; an angle-gear and a worm coaxially journaled on said head; a spindle mounted on said head and swivelable about the axis of said worm; a hob supporting spindle journaled in said mount; a worm-wheel on said spindle meshing with said worm; a work-supporting spindle; a first splined shaft arranged transversely to said hob-supporting spindle; an angle-gear splined to said shaft and meshing with said first-mentioned angle-gear; a second splined shaft arranged transversely to said work-supporting spindle and connected by a worm and worm-wheel thereto; and an intermediate shaft arranged parallel with said second shaft and connected at one end by bevel-gears directly to said first shaft; four spur-gears connecting the other end of said intermediate shaft with said second shaft; and means for effecting a progressive feed of said head in a direction parallel with the work-supporting spindle.

7. A balanced-drive hobbing-machine combining a swivel-mounted hob-supporting spindle and a work-supporting spindle; a transmission connecting said spindles and consisting in serial relation first of a set of four angled gears, second of a pair of angled-gears, third of a set of four spur-gears, and fourth of a pair of angled gears and transmission shafts directly connecting each of said sets and pairs of gears in series; a prime-mover connected to said transmission train between the one set and pair and the other set and pair, whereby the motion to the spindles will be transmitted in two balanced-drive paths, the one being through the first set and pair of gears, and the other being through the second set and pair of gears; and means for effecting a progressive relative translation between said spindles in a direction parallel with the work-supporting spindle.

8. A balanced-drive hobbing-machine combining a swivel-mounted hob-supporting spindle and a work-supporting spindle; means for bodily shifting one of said spindles in a direction transverse to the axis of the other to adjust the off-set relation between said spindles; a transmission connecting said spindles and consisting in serial relation first of a set of four angled-gears, second of a pair of angled-gears, third of a set of four spur-gears, and fourth of a pair of angled-gears; transmission shafts directly connecting each of said sets and pairs of gears in the order named, one of the first set of angle gears of said transmission being slidably shiftable on one of said shafts, said shaft being arranged to extend in a direction transverse to the axis of the hob supporting spindle; and means for effecting a progressive relative translation between said spindles in a direction parallel with the work-supporting spindle.

9. A balanced-drive hobbing-machine combining a hob-supporting spindle, and a work-supporting spindle, worm-wheels on each spindle; an intermediate shaft arranged transversely to said spindles, an angle-gear mounted at one end of said shaft and a spur-gear detachably secured directly to its other end; a first and a second splined shaft arranged transversely to said spindles, respectively; an angle gear secured to one end of said first splined shaft and meshing directly with said first mentioned angle gear; a detachable spur-gear secured directly to one end of said second splined shaft; two coaxial spur gears in series with said detachable spur gears; an angle-gear splined to said first shaft; two coaxial angle-gears connecting said angle-gear with the worm wheel on said hob-supporting spindle; a worm splined to said second splined shaft and meshing directly with the worm-wheel for propelling said work spindle; a bed; a slidable carriage supporting said work-spindle; a slidable head; a mount for said hob-spindle swiveled to said head about the axis of said two coaxial angle-gears; and means for effecting a progressive relative feed of said head in a direction parallel with said work spindle.

In witness whereof, I hereunto subscribe my name.

WILLIAM F. ZIMMERMANN.